US 6,546,376 B1

(12) United States Patent
Yen et al.

(10) Patent No.: US 6,546,376 B1
(45) Date of Patent: Apr. 8, 2003

(54) ELECTRONIC PAYMENT DEVICE USING BALANCED BINARY TREE AND THE METHOD OF THE SAME

(75) Inventors: Sung-Ming Yen, Taipei (TW); Chiung-Ying Huang, Taipei (TW); Chien-Chung Yuan, Taipei (TW); Jack G. Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 09/344,067

(22) Filed: Jun. 25, 1999

(51) Int. Cl.$^7$ .............................................. G06F 17/60
(52) U.S. Cl. ........................ 705/40; 705/50; 705/75; 713/177
(58) Field of Search ..................... 713/177; 705/40, 705/75, 50

(56) References Cited

U.S. PATENT DOCUMENTS

| | | | | |
|---|---|---|---|---|
| 5,432,852 A | * | 7/1995 | Leighton et al. | 380/30 |
| 5,963,648 A | * | 10/1999 | Rosen | 380/24 |
| 5,974,141 A | * | 10/1999 | Saito | 380/4 |
| 5,983,208 A | * | 11/1999 | Haller et al. | 705/40 |

FOREIGN PATENT DOCUMENTS

| EP | 0932109 A2 | * | 1/1999 | G06F/17/30 |
|---|---|---|---|---|

OTHER PUBLICATIONS

Johnson et al; Reexamining B–trees:free–at–empty is better than merge–at–half, Dr. Dobb's Journal, v17, n1, p44(3), Jan 199.*

Tashek, John; Indexing schemes chip away at lenghty query time, PC week, v13, n13 p95(1), Apr. 1996.*

* cited by examiner

Primary Examiner—Vincent Millin
Assistant Examiner—Jagdish Patel
(74) Attorney, Agent, or Firm—Bacon & Thomas, PLLC

(57) ABSTRACT

Disclosed is an electronic payment device and its method using an balanced binary tree for calculating a first data $X_k$ of current consumption or a plurality of root values $R_q$ from an initial value $X_n$ of the amount of money that user purchases. The first data $X_k$ is correspondent to a position value j with a respective relation of j=n−k+1. The first data $X_k$ is generated according to the value of the binary code $d_{m-1}d_{m-2} \ldots d_1d_0$ of the position value j being a 0 or 1, by formula $X_k=h_{d0}(\ldots (h_{dm-2}(h_{dm-1}(X_n))))$. If the binary code $d_i=0$, i=m−1, m−2, ..., 1, 0, then the first one-way function $h_0$ is used as an operating function. Otherwise, the second one-way function $h_1$ is operated when the binary code $d_i=1$. Moreover, a function operating device for an electronic payment using an balanced binary tree is also disclosed. The present invention requires less calculation than that in the prior art, and thus is more effective.

2 Claims, 7 Drawing Sheets

ELECTRONIC PAYMENT DEVICE USING BALANCED BINARY TREE AND THE METHOD OF THE SAME

FIELD OF THE INVENTION

The present invention relates to an electronic payment system in electronic commerce of network, and especially to a system using a balanced binary tree structure to calculate. The network used includes an Internet, a telephone network, a dedicated network, a cable TV network, etc.

BACKGROUND OF THE INVENTION

The basic structure of an electronic payment system 10 is illustrated in FIG. 1. A subscribe computer 1 and a merchant computer 2 perform data communication for completing a transaction through an Internet 3 (or other network). In general, the action of transferring account or verification for security is performed through an electronic payment service center 4 (for example, banks). In FIG. 2, the subscribe computer 1 purchases the total unit n by paying an amount of money to the electronic payment service center 4 and is awarded with an authority. Then, the total unit n is operated by a one-way function h to obtain a contrast data M. If the user desires to consume, the subscribe computer 1 firstly subtracts the unit spent, and uses the current unit k to calculate a value $X_k$ representing current consumption state to the amount of money. These datum (M and $X_k$) is sent to the merchant computer 2 through the Internet 3. In a reprocessing procedure P, the merchant computer 2 calculates a second value $X'_k$ using identical one-way function h. In the conventional operating process of the subscribe computer 1 with respect to the values M and $X_k$ a payment chain of one-way hash function shown in FIG. 3 is used, which has the relation of a one-way function $X_{n-1}=h(X_n)$. It means that the value $X_n$ is substituted into a one-way hash function h to operate as a one-dimension function or obtaining the next value $X_{n-1}$. As shown in this figure, in the subscribe computer 1, starting from substituting the initial value of a random number $X_n$ into an one-way hash function h to perform n times for deriving a contrast data M or to perform n–k times for deriving $X_k$. Then, in the reprocessing procedure P of the merchant computer 2, by the same one-way hash function h, $X_k$ is operated to generate $X'_k$ and then the value $X'_k$ is contrasted with data M. If $X'_k$=M, it identifies this transaction is successful, thus the merchant computer 2 provides services or merchandises to the subscriber and requests a transferring account to the electronic payment service center 4, thus storing current $X_k$ as a contrast value M for being used in next consumption.

Since the one-way hash function is irreversible, any $X_k$ only operates in a forward direction (the leftward direction in FIG. 3). Therefore, for each consumption (with different k value, and value k is increased monotonically to value n), the subscribe computer 1 calculates from $X_n$ to $X_k$ for n–k times. For example, assuming one unit of money is consumed each time, thus, n–1 times of function operation are necessary to calculate from $X_n$ to $X_1$. In the next consumption, from $X_n$ to $X_2$ similarly, n–2 times of operation are necessary. In further next consumption, from $X_n$ to $X_3$, n–3 times of operation is necessary. And for $X_{n-1}$, only one time of operation from $X_n$ is necessary. Thus, in the conventional calculation, totally, (n–1)+(n–2)+ . . . +1 times of functional operation are performed, and then this total value is divided by n to obtain an average of (n–1)/2 times for each consumption. For such a large amount of operations, the subscribe computer 1 with a finite ability of hardware (for example, an IC card) is insufficient. Therefore, the operation efficiency becomes low. The larger the unit of purchase, the lower the operation efficiency. Thus, the prior art only can be used in an electronic payment system with a smaller amount of money.

SUMMARY OF THE INVENTION

Accordingly, the primary object of the present invention is to provide an electronic payment device using an balanced binary tree for improving the calculating efficiency of an electronic payment system.

Another object of the present invention is to provide an electronic payment device using an balanced binary tree for reducing the operation times of an electronic payment system.

Another object of the present invention is to provide an electronic payment device using an balanced binary tree with a modularized design.

In order to attain the aforementioned objects, in the electronic payment system of the present invention, an operation device is installed in the subscribe computer for calculating a first data $X_k$ representing current consumption states, or a plurality of root values $R_q$, in order that for each root value $R_q$, a contrast value $M_q$ can be obtained from a third one-way function h. The operation device includes a data providing device for providing datum including the total unit n of the amount of money that user purchases, a first one-way function $h_0$, a second one-way function $h_1$, and the current unit k of the money after current consumption. The first one-way function $h_0$ and the second one-way function $h_1$ are different functions. Besides, a microprocessor is used to calculate the position value j of the current unit k, where j=n–k+1; and to pick up every binary code of the position value j from $d_{m-1}$ to $d_0$ sequentially, where j=$(d_m d_{m-1} \ldots d_1 d_0)_2$, where each binary code $d_i$=0 or 1, and i=m,m–1, . . . 1,0; and to calculate the first data $X_k$ of the current unit k of the amount of money, according to the value of the binary code $d_{m-1}d_{m-2} \ldots d_1d_0$ of the position value j being a 0 or 1 by formula $X_k=h_{d0}(\ldots(h_{dm-2}(h_{dm-1}(X_n))))$, where $h_{d1}(\ldots)$, i=m–1,m–2, . . . ,1,0, it represents that if binary code $d_i$=0, then the first one-way function $h_0(\ldots)$ serves as an operating function, and if the binary code $d_i$=1, then the second one-way function $h_1(\ldots)$ serves as an operating function. After the first data $X_k$ is calculated, the $X_k$ and the contrast values $M_q$ are sent to the merchant computer through a network. Then, the merchant computer performs a reprocess procedure to the first data $X_k$ to form as a second data $X'_k$, and checks whether the respective contrast value $M_q$ is equal to the second data $X'_k$, so as to determine whether this translation is successful.

The data providing device of the present invention is a storing device (such as ROM, hard disk, etc), or an input device (such as a modem) reading data from a network.

It is suggested that the first one-way function $h_0$ and the second one-way function $h_1$ of the present invention are one-way Hash functions, for example, a MD-5 algorithm, a RIPE-MD algorithm, a SHA-1 algorithm, a MDC2 algorithm, a MDC4 algorithm, etc. It is preferred that the first and second one-way functions $h_0$, $h_1$ are RIPE-MD algorithm, SHA-1 algorithm, respectively. They have the advantages of short data length and preferred reliability.

In the present invention, the operating device can be installed and operated step by step within a subscribe computer, or be modularized as a chip installed in the subscribe/merchant computer. The subscribe computer can be made as an IC card itself (such as a Smart IC card) contained such device. Of course, it can be used in a reprocessing procedure of the merchant computer for reducing operation times and improving the operating efficiency.

DESCRIPTION OF PREFERRED EMBODIMENT

Figure 1:
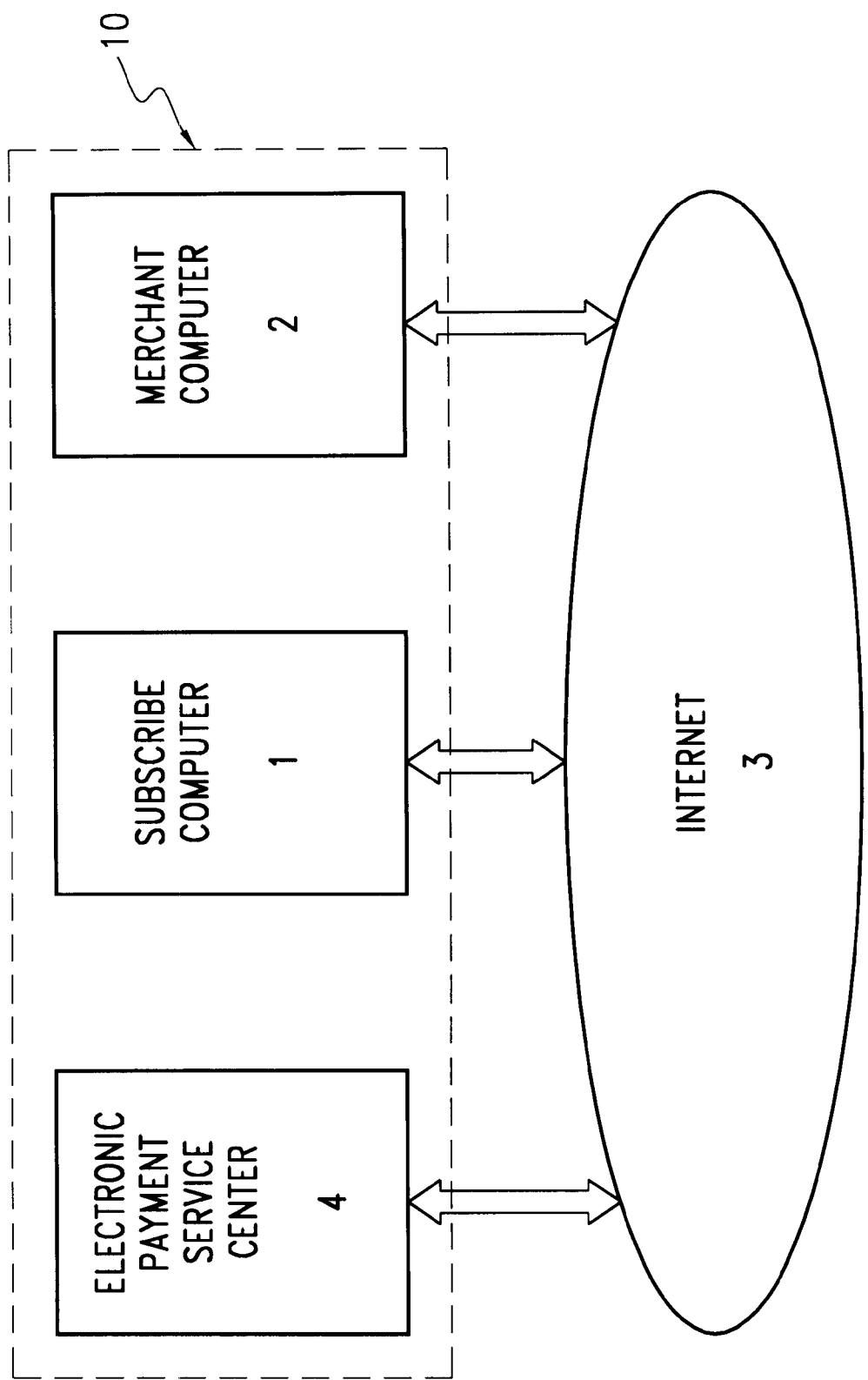
FIG. 1 shows a basic structure of an electronic payment system.
Figure 2:
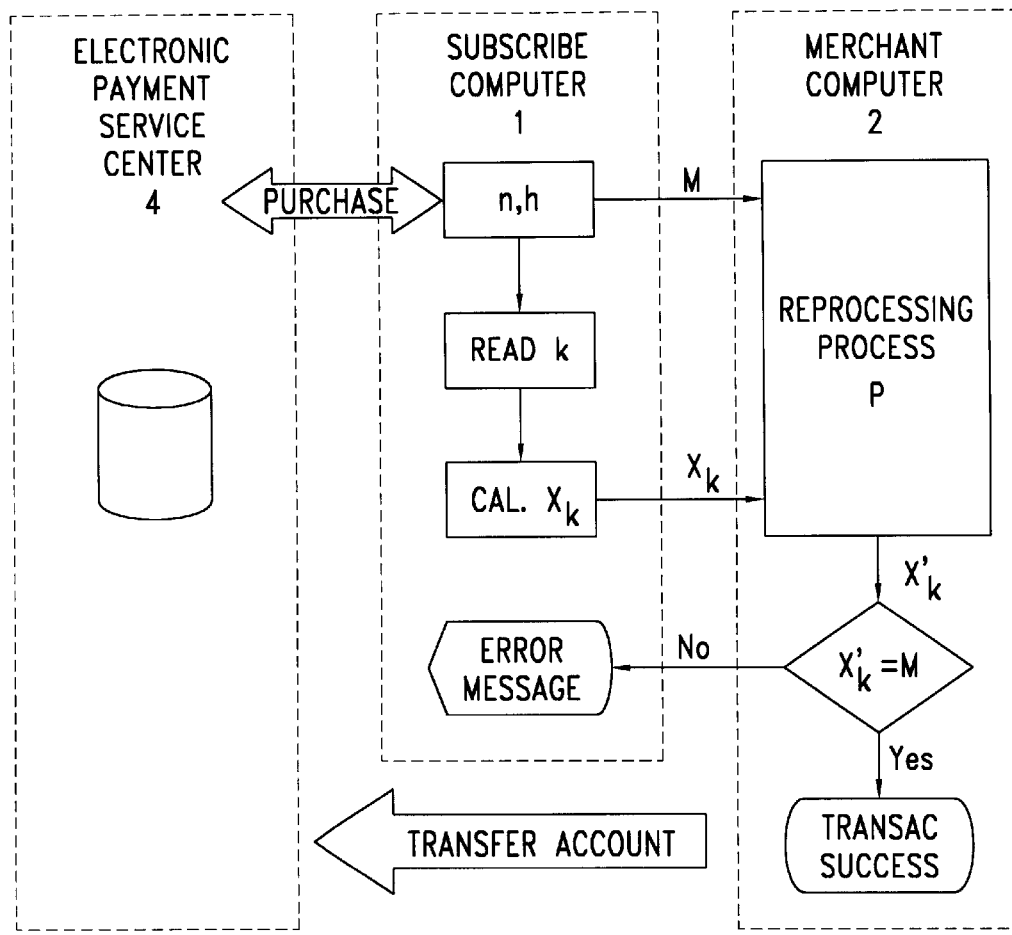
FIG. 2 shows the flow chart about the transaction of an electronic payment system.
Figure 3:
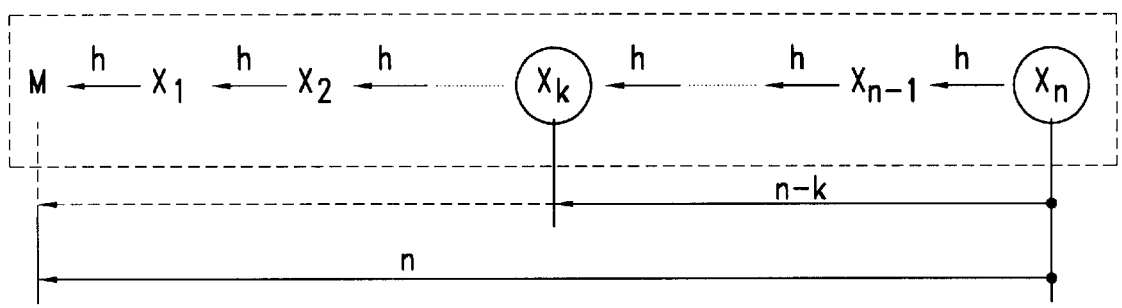
FIG. 3 is a schematic view showing the operating process of a conventional one dimensional one-way hash function.
Figure 4:
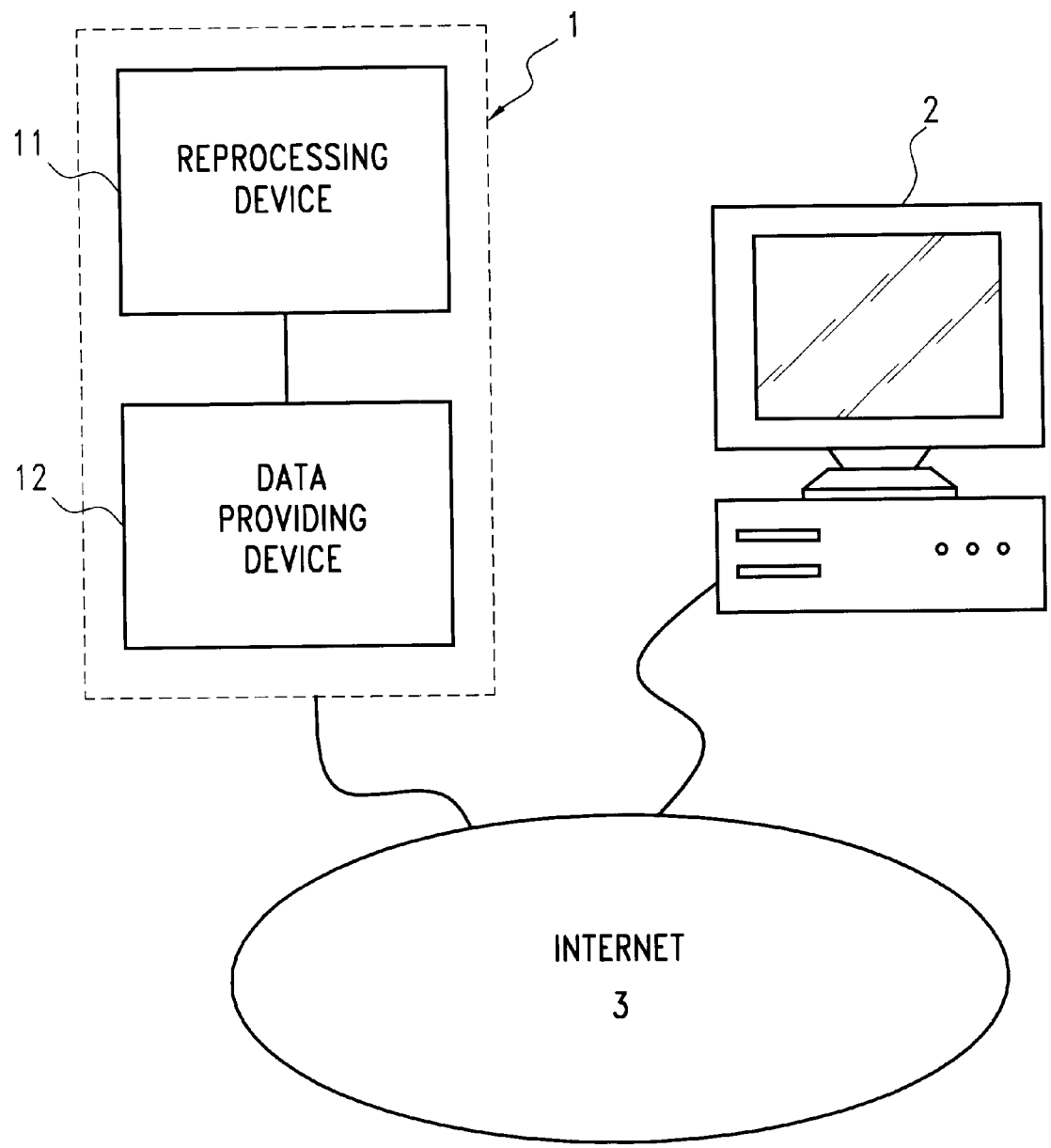
FIG. 4 shows the structure of the operating device according to the present invention.

With reference to FIG. 4, the operating device of the present invention is installed within a subscribe computer 1, and includes a data providing device 12 and a microprocessor 11. The data providing device 12 may be a memory, such as ROM, hard disk, or modem connected to an Internet 3 for providing data. In this embodiment, an Internet 3 serves to exchange data (it also can exchange data through a telephone network, a dedicated network, a cable TV network, or other equivalent network).

Figure 5:
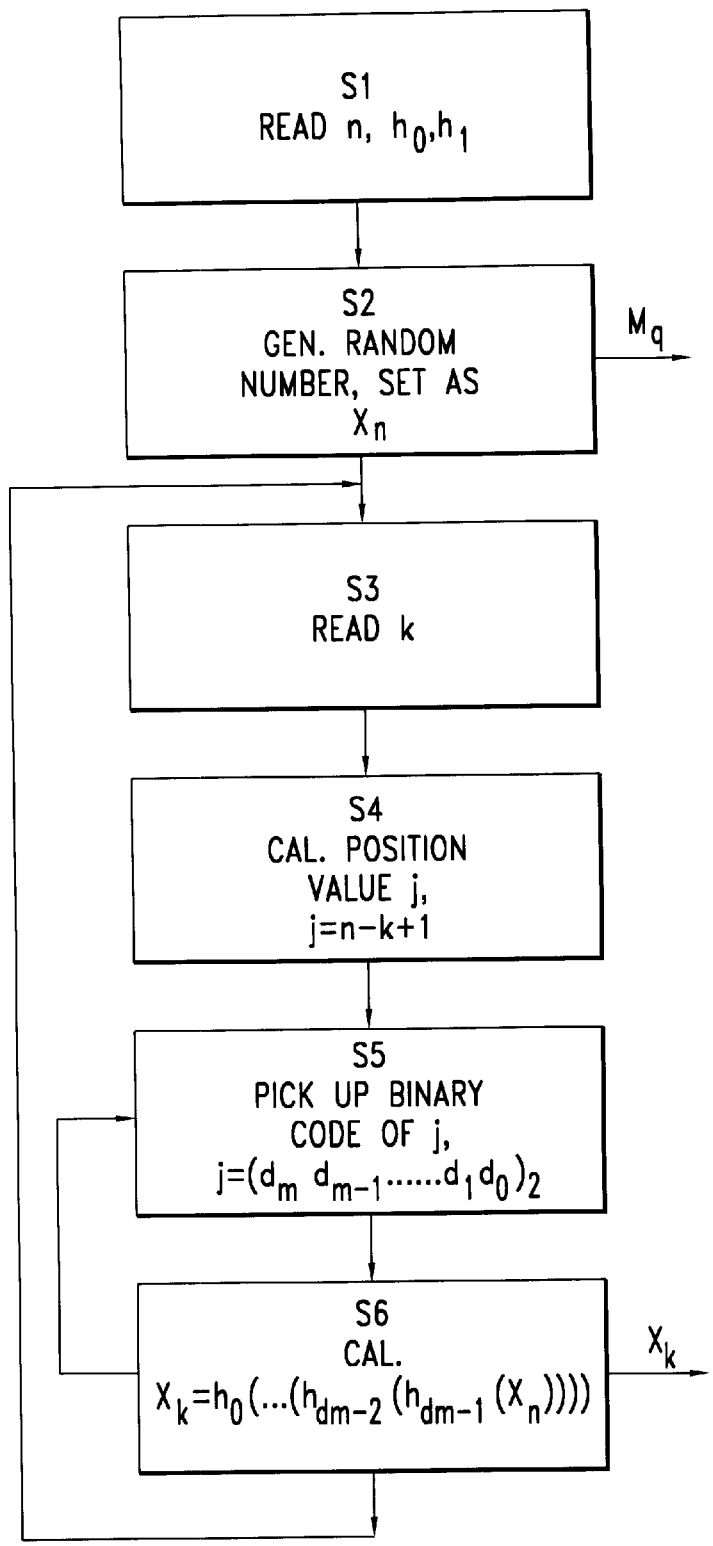
FIG. 5 shows the flow chart of the calculating method in the present invention.

Referring to FIG. 5, step S1 to S2 are initial operations, step S3 to S6 shows the operating process of the present invention. The microprocessor 11 reads or receives datum including the total unit n of the amount of money that user purchases, first one-way function $h_0$ and second one-way function $h_1$ and other data (step S1). A random number is generated at first as an initial value $X_n$ (step S2).

If a user desires to consume a service or an merchandise, the microprocessor 11 reads or receives a current unit k of the amount of money after current consumption (step S3), and by the formula j=n−k+1, the position value j of the current unit k (step S4) is calculated. Then, the binary code $d_m d_{m-1} \ldots d_1 d_0$ of the position value can be picked up (step S5). Starting from $d_{m-1}$ to $d_0$, the binaries thereof are picked up one by one sequentially, then these values are taken into formula $X_k = h_{d0}(\ldots (h_{dm-2}(h_{dm-1}(X_n))))$ for performing m times operation (step S6), where $h_{di}(\ldots)$, i=m−1,m−2, … ,1,0 represents that if the binary code $d_i=0$, then the first one-way function $h_0(\ldots)$ serves to perform a function operation, and if the binary code $d_i=1$, then the second one-way function $h_1(\ldots)$ serves to perform the function operation. Therefore, by only m times of operation, the first data $X_k$ representing the current unit k of the amount of money after current consumption is calculated. In the next consumption, the next consumption to current unit k is reread from step S3, thus, the next first data $X_k$ may be calculated from step S3 to S6.

Figure 6:
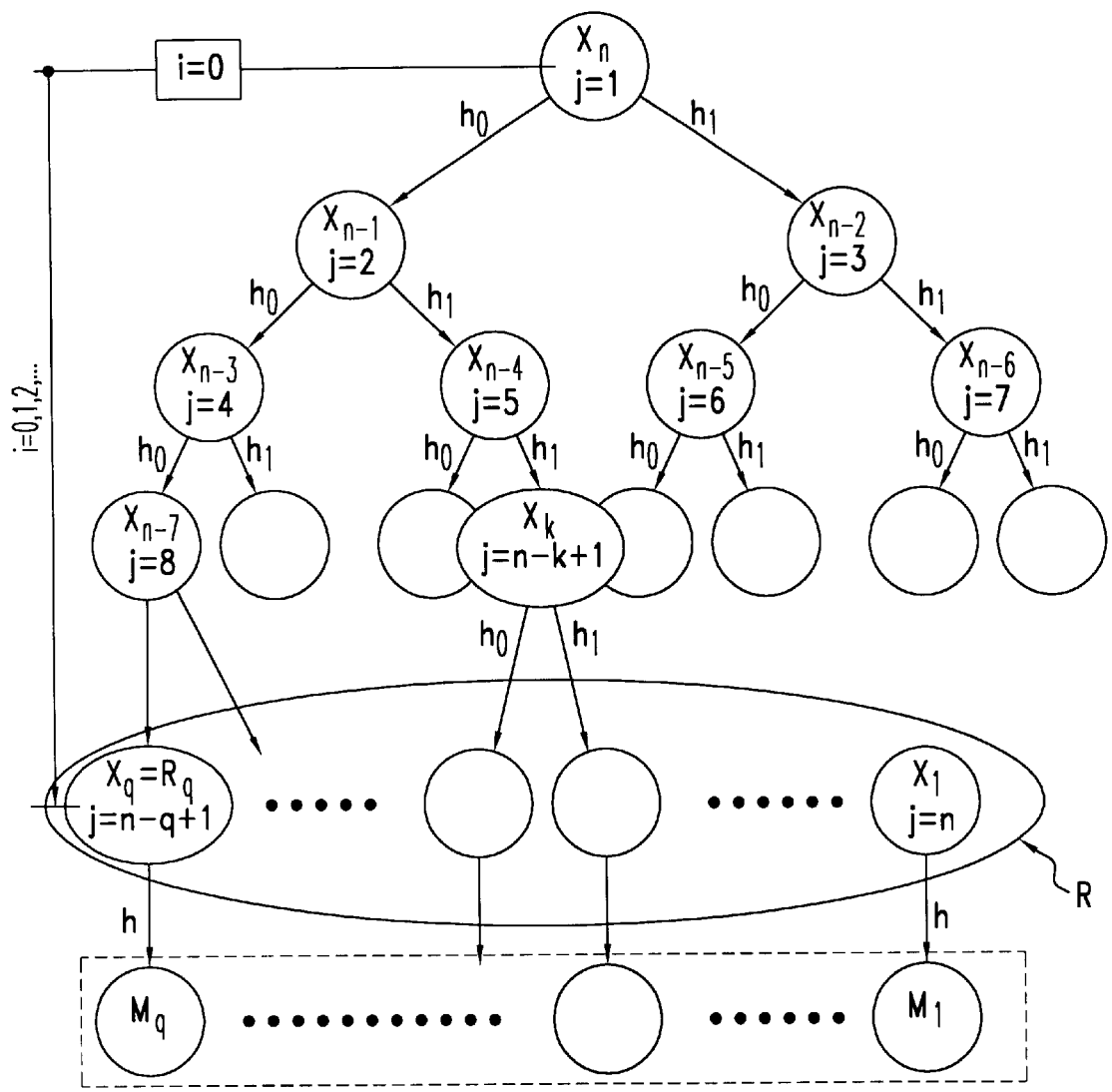
FIG. 6 is a schematic view showing the operating process of two one-way hash functions in the balanced binary tree structure.

FIG. 6 illustrates the arithmetic meanings in step S3 to S6 of the operation process according to the present invention. In the primary technical features of the present invention, a binary tree serves as an operation structure of the present invention, wherein each node may be divided into two sub-nodes, then the sub-nodes may be divided into two sub-sub-nodes, this sequences may be performed sequentially. Since each node is divided into two sub-nodes, thus it is called as a balanced binary tree structure. As shown in the figure, in the present invention, starting form the nodes in the uppermost layer, then according to the order of from upper to lower, and from left to right, each node is defined as $X_n, X_{n-1}, X_{n-2} \ldots, X_2, X_1$. In each node, the leftward orientation is defined as an operation according to the first one-way function $h_0$, while the rightward orientation is defined as an operation according to the second one-way function $h_1$. For example, for $X_n$, the operation may be performed leftwards in the following layer to derive $X_{n-1} = h_0(X_n)$ by the first one-way function $h_0$, and the operation may be performed rightward in the further following layer to derived $X_{n-2}=h_1(X_n)$ by the second one-way function $h_1$, the others may be derived similarly. In order that each node $X_k$ may be derived from the uppermost $X_n$ in the present invention, a conversion mechanism for position value j is used (step S4). Namely, starting from the uppermost node ($X_n$) of the balanced binary tree structure, according to the order of from upper to lower, and from left to right, each node is defined sequentially to have a position value j=1,2,3, … ,n. Accordingly, the lower subscription k of each node $X_k$ has a position relation j=n−k+1 with the position value j. If the position value j is represented by a binary value, then $j=(d_m d_{m-1} \ldots d_1 d_0)_2$, where $d_i=0$ or 1, i=m,m−1, … ,1,0 ($d_m$ represents a most significant bit, $d_0$ represents the least significant bit)

If the $X_k$ about the current unit k after current consumption is desired to be calculated, it is only necessary to firstly calculated the respective position value j (step S4), then according to the binary codes $d_m d_{m-1} \ldots d_1 d_0$ of position value j (step S5), the most significant bit $d_m$ is deserted. Starting from $d_{m-1}$ to $d_0$, the binary value 0 or 1 is derived one by one, by formula $X_k = h_{d0}(\ldots (h_{dm-2}(h_{dm-1}(X_n))))$, the first data $X_k$ can be operated rapidly (step S6), where $h_{di}(\ldots)$ represents if binary $d_i=0$, i=m−1,m−2, … ,1,0, then the first one-way function $h_0(\ldots)$ is employed. If the binary $d_i=1$, then the second one-way function $h_1(\ldots)$ serves to calculate the desired answer. Similarly, in the present invention, the root values $R_q$ of a plurality of nodes $X_q$ in the lowest layer i $[i=(\log_2 n+1)-1]$ can be calculated so as to form a root series R. By a third one-way function h, the contrast values $M_q$ of the root values $R_q$ is calculated. Preferably, the third one-way function h, second one-way function $h_0$, and second one-way function $h_1$ use different one-way hash functions.

When consumption is occurred in Internet 3, the first data $X_k$ and contrast value $M_q$ are transferred to the merchant computer 2 through the Internet 3. The merchant computer 2 re-processes $X_k$ to form as a second data $X'_k$. If $X'_k = M_q$, then it represents the transaction is successful. The merchant computer 2 may store the first data $X_k$ as the contrast value M for later use. Wherein, in the reprocess procedure P, the merchant computer 2 also can use the present invention to calculated the second data $X'_k$ from the first data $X_k$ rapidly.

Figure 7:
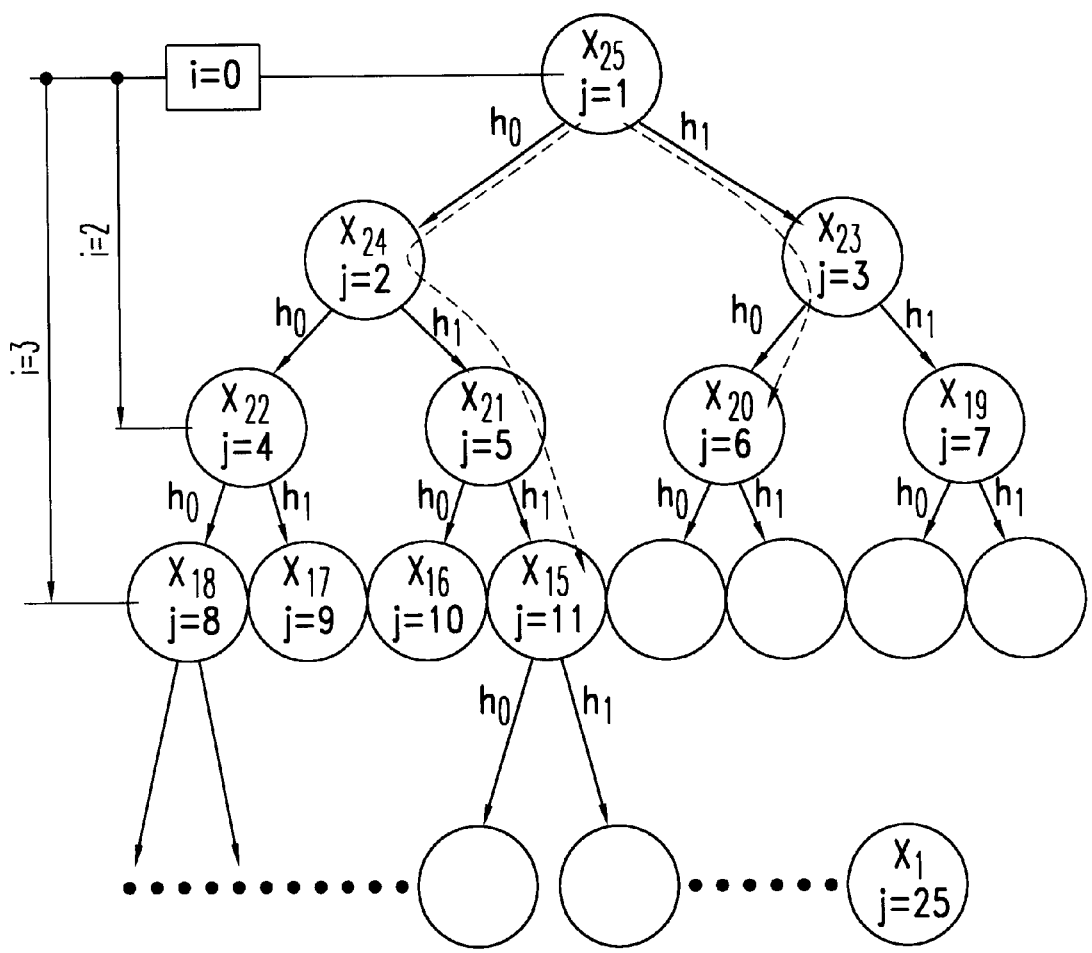
FIG. 7 is a schematic view showing the operating process of two embodiments.

FIG. 7 shows two embodiments illustrating the operation of the present invention. The first one-way function $h_0$ and the second one-way function $h_1$ are one-way hash function of RIPE-MD algorithm and SHA-1 algorithm respectively. In the first embodiment, assume that user purchases $10 for n=25 units (1 unit=$0.4), and consumes 15 units at the first time. To calculate the first data $X_{15}$ of the current consumption, by the formula j=n−k+1=25−15+1=11, the position value $j=(11)_{10}=(d_3d_2d_1d_0)_2=(1011)_2$ of node $X_{15}$ is derived by conversion at first, deserting the first binary code $d_3=1$, for other binary codes, $d_2=0$, $d_1=1$, $d_0=1$, are substituted into formula $X_{15}=h_{d0}(h_{d1}(h_{d2}(X_n)))$, then $X_{15}=h_1(h_1(h_0(X_{25})))$ is obtained. Compare to the balanced binary tree structure shown in FIG. 7, it is appreciated from the viewpoint of arithmetic that the data $X_{15}$ will be generated by only three layer operation (i=3), namely, a leftwards first one-way function $h_0$ is operated first from $X_{25}$, and then two rightwards second one-way function $h_1$ are operated. This is more effective than the prior art in which single one-way function is used, from $X_{25}$ to $X_{15}$, 25−15=10 times of functional operation is necessary.

If in next time, 5 units of money is consumed, it is desired to calculate the first data $X_{20}$ of next consumption of unit k=20, the position value j=n−k+1=25−20+1=6 is generated from formula, and $j=(6)_{10}=(d_2d_1d_0)_2=(110)_2$ is derived, then deserting the first binary code $d_2=1$, other binary codes $d_1=1$, $d_0=0$ are substituted into formula $X_{20}=h_{d0}(h_{d1}(X_n))$, and thus $X_{20}=h_0(h_1(X_{25}))$ is obtained. With reference to the balanced binary tree structure of FIG. 7, it is appreciated from the viewpoint of arithmetic that the first data $X_{15}$ is generated by only two layer operation (i=2) from $X_{25}$, namely, a rightwards second one-way function $h_1$ operation and a further leftwards first one-way function $h_0$ are performed. This is more effective than the prior art in which a single one-way function is used, from $X_{25}$ to $X_{20}$, 25−20=5 times of functional operation is necessary.

Figure 8:
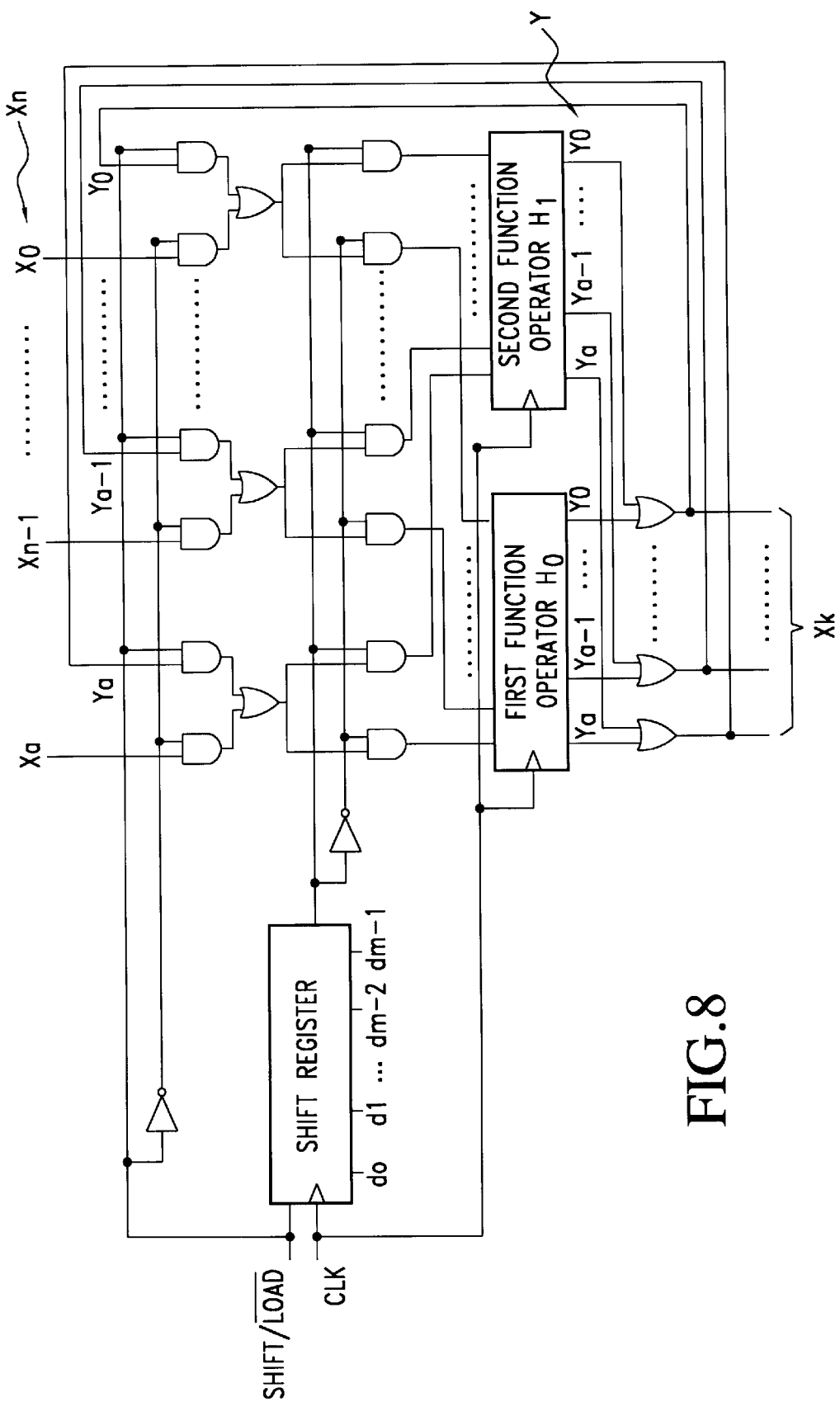
FIG. 8 shows a circuit diagram about the modularization embodiment according to the present invention.

In practical application, the repeated steps in the present invention can be modularized. It is preferred that it is sintered in a chipset. FIG. 8 shows a modularized circuit. Where the module includes a first function operator $H_0$ for operating the first one-way function $h_0$, a second function operator $H_1$ for operating the second one-way function $h_1$, where the second one-way function $h_1$ and the second one-way function $h_0$ have different one-way hash function. Moreover, a shift register 110 stores merchant binary code $d_{m-1}d_{m-2} \ldots d_1d_0$ of position value j except that the most significant value $d_m$, starting from $d_{m-1}$ to $d_0$, a binary value $d_i=0$ or 1 is shifted out one at a time, where i=m−1, m−2, . . . ,1,0.

When the first data $X_k$ of current consumption to the current unit k is desired to be operated, at first from formula j=n−k+1, the respective position value j of the first data $X_k$ is calculated, and then the binary code $d_{m-1}d_{m-2} \ldots d_1d_0$ is stored into the shift register 110, which represents the initial value $X_n=(X_aX_{a-1} \ldots X_0)_2$ of total unit that user purchase, or the previous output data $Y=(Y_aY_{a-1} \ldots Y_0)_2$ serves as an input. Then, by the logic combination of AND gate, OR gate, etc., the input value is sent to the first function operator $H_0$ and the second function operator $H_1$ for performing function operation. If the output of the shift register 110 is 0, then the first function operator $H_0$ is driven. If the output of the shift register 110 is 1, then the second function operator $H_1$ is driven, thus the output data $Y=(Y_aY_{a-1} \ldots Y_0)_2$ may be easily obtained from the output end of the first function operator $H_0$ or the second function operator $H_1$. Then, the output serves as the input of next stage, through the logic combination of AND gate, OR gate, etc., it is sent to the first function operator $H_0$ and second function operator $H_1$. Moreover, according to the output of the shift register 110 being a 0 or a 1, the first function operator $H_0$ or the second function operator $H_1$ is driven for operating. The operating procedure is performed repeatedly until the shift register 110 completely output the binary code of position value j from $d_{m-1}$ to $d_0$. Therefore, the first data $X_k$ may be easily generated from the output end of the first function operator $H_0$ or second function operator $H_1$. Similarly, this module can be used to derive a root value $R_q$, or used in the merchant computer for rapidly obtaining the second data $X'_k$ from the first data $X_k$.

What is claimed is:

1. An electronic payment system comprising:

a subscribe computer and a merchant computer communicating via a communication network for performing a commercial transaction having a purchase amount;

an electronic payment service center connected to said network and configured to receive a total amount of money with a total unit n from said subscribe computer for said commercial transaction; said subscribe computer farther comprising:

a balanced binary tree further comprising:

a plurality of nodes $X_n$, $X_{-1}$, $X_{n-2}$, . . . , $X_2$ and $X_1$ representing respective current amount of money $X_k$, derived by subtracting said purchase amount from said total amount, with a current unit k wherein k=n, n−1, n−2, . . . , 2 and 1;

each of the nodes in said balanced binary tree further comprising a position value j=1, 2, 3, . . . n−1 and n, respectively, wherein j=n−k+1;

a plurality of binary codes $(d_md_{m-1} \ldots d_1d_0)$ respectively representing said position values wherein for each of said binary codes $(d_i)$ i=m−1, m−2, . . . , 1 and 0;

a plurality of root values derived from the plurality of nodes $X_n$, $X_{n-1}$, $X_{n-2}$, . . . , $X_2$ and $X_1$ representing said respective current amount of money $X_k$;

a plurality of contrast values calculated from said root values through a one-way hash function at said subscribe computer; and a plurality of second nodes $X'_n$, $X'_{n-1}$, $X'_{n-2}$, . . . , $X'_2$ and $X'_1$ representing respective second current amount of money $X'_k$ wherein k=n, n−1, n−2, . . . , 2 and 1 derived at said merchant computer through said one-way hash function;

wherein said merchant computer verifies said commercial transaction as successful if said second current amount of money $X'_k$ (wherein k=n, n−1, n−2, . . . , 2 and 1) are equal to said contrast values.

2. A method for an electronic payment system having a subscribe computer and a merchant computer communicating via a communication network for performing a commercial transaction having a purchase amount, and an electronic payment service center receiving a total amount of money with a total unit n from said subscribe computer for said commercial transaction, the method comprising the steps of:

providing a balanced binary tree;

providing a plurality of nodes $X_n$, $X_{n-1}$, $X_{n-2}$, . . . , $X_2$ and $X_1$ in said binary tree representing respective current amount of money $X_k$;

deriving said current amount of money $X_k$ by subtracting said purchase amount from said total amount with a current unit k wherein k=n, n−1, n−2, . . . , 2 and 1;

wherein each of the nodes in said balanced binary tree further comprises a position value j=1, 2, 3, . . . , n−1 and n, respectively, wherein j=n−k+1;

providing a plurality of binary codes $(d_md_{m-1} \ldots d_1d_0)$ respectively representing said position values wherein for each of said binary codes $(d_i)$ i=m−1, m−2, . . . , 1 and 0;

deriving a plurality of root values from the plurality of nodes $X_n, X_{n-1}, X_{n-2}, \ldots, X_2$ and $X_1$ representing said respective current amount of money $X_k$;

calculating a plurality of contrast values from said root values through a one-way hash function at said subscribe computer;

deriving a plurality of second nodes $X'_n, X'_{n-1}, X'_{n-2}, \ldots, X'_2$ and $X'_1$ representing respective second current amount of money $X'_k$ wherein $k=n, n-1, n-2, \ldots, 2$ and $1$ through said one-way hash function at said merchant computer; and verifying said commercial transaction as successful if said second current amount of money $X'_k$ (wherein $k=n, n-1, n-2, \ldots, 2$ and $1$) are equal to said contrast values.

* * * * *